(12) United States Patent
Davis, Jr. et al.

(10) Patent No.: US 6,176,588 B1
(45) Date of Patent: Jan. 23, 2001

(54) LOW COST LIGHT WEIGHT MIRROR BLANK

(75) Inventors: Claude L. Davis, Jr., Painted Post, NY (US); Michael W. Linder, Weisbaden (DE)

(73) Assignee: Corning Incorporated, Corning, NY (US)

( * ) Notice: Under 35 U.S.C. 154(b), the term of this patent shall be extended for 0 days.

(21) Appl. No.: 09/461,067

(22) Filed: Dec. 14, 1999

(51) Int. Cl.$^7$ .............................. G02B 5/08; G02B 7/192
(52) U.S. Cl. ............................. 359/848; 359/883
(58) Field of Search .................... 359/846, 848, 359/871, 883

(56) References Cited

U.S. PATENT DOCUMENTS

| | | | |
|---|---|---|---|
| 2,326,059 | 8/1943 | Nordberg | 100/52 |
| 3,535,098 | 10/1970 | Babcock | 65/33 |
| 3,713,728 | 1/1973 | Austin et al. | |
| 4,035,065 | 7/1977 | Fletcher et al. | |
| 4,343,533 | 8/1982 | Currin et al. | |
| 4,501,602 | 2/1985 | Miller et al. | 65/18.2 |
| 4,550,005 | 10/1985 | Kato | 264/177 |
| 4,842,398 | 6/1989 | Ducassou | |
| 4,856,887 | 8/1989 | Wakugawa et al. | |
| 5,043,002 | 8/1991 | Dobbins et al. | 65/3.12 |
| 5,076,700 | 12/1991 | DeCaprio | 359/848 |
| 5,208,704 | 5/1993 | Zito | 359/848 |
| 5,227,921 | 7/1993 | Bleier et al. | 359/848 |
| 5,258,150 | 11/1993 | Merkel et al. | 264/43 |
| 5,286,323 | 2/1994 | Bagley | 156/89 |
| 5,316,564 | 5/1994 | Nakamura et al. | 65/36 |
| 5,403,787 | 4/1995 | Day | 501/7 |
| 5,428,483 | 6/1995 | Sato et al. | 359/838 |
| 5,448,418 | 9/1995 | Hotate et al. | 359/883 |
| 5,487,863 | 1/1996 | Cunningham et al. | 264/177.11 |
| 5,576,884 | 11/1996 | Ise et al. | 359/154 |
| 5,604,642 | 2/1997 | Deminet et al. | 359/848 |
| 5,640,282 | 6/1997 | Ise et al. | 359/846 |
| 5,698,484 | 12/1997 | Maxon | 501/54 |
| 5,760,979 | 6/1998 | Saito | 359/859 |
| 5,825,565 | * 10/1998 | Papenburg et al. | 359/883 |

OTHER PUBLICATIONS

HPFS® Standard Grade, Corning Incorporated May 1999.
HPFS® ArF Grade, Corning Incorporated May 1999.
HPFS® KrF Grade, Corning Incorporated May 1999.
Corning Catalytic Converter Substrate, www.corning.com/epd/products Jun. 21, 1999.

* cited by examiner

Primary Examiner—Cassandra Spyrou
Assistant Examiner—Mark A. Robinson
(74) Attorney, Agent, or Firm—Edward F. Murphy

(57) ABSTRACT

An inexpensive lightweight mirror blank having good dimensional stability, and a method of making the same is provided. The mirror blank includes an extruded ceramic honeycomb core and a faceplate bonded or otherwise affixed to the front surface of the core. The extruded honeycomb core is comprised of a matrix of cell walls defining an array of cells, with the number of cells being greater than about 16 cells per square inch, to render the core extremely light in weight yet sufficiently rigid and strong to support the optical faceplate. The faceplate is formed from a material that is capable of being polished to an optical surface. An optional back plate can be bonded or otherwise affixed to the back surface of the core in order to improve stiffness and mechanical stability of the mirror blank.

25 Claims, 3 Drawing Sheets

LOW COST LIGHT WEIGHT MIRROR BLANK

FIELD OF THE INVENTION

The present invention relates to the field of reflective optics and, more particularly, to a light-weight mirror blank that can be made at very low cost and at volume efficiencies, yet deliver high quality optics.

BACKGROUND OF THE INVENTION

Reflective mirrors are used in many applications such as telescopes, binoculars, cameras, microscopes, optical instruments and other applications where the concentration, diffusion, magnification or directional change of a light beam is required. Such mirror structures typically comprise a core or substrate made of glass, glass-ceramic, silicon carbide, or a graphite composite, with a mirror or reflective surface formed on or bonded to the core.

It is old and well known in the art to fabricate mirror structures so that they are light in weight. There are many advantages that follow from making mirrors that are as light in weight as possible. For example, light weight mirrors have less thermal mass and therefore do not distort as much and come to thermal equilibrium faster when subjected to thermal transitions. They also are less subject to gravity induced sag or distortion in the shape of the reflective surface, and therefore can produce superior images. Because of their lower mass, light weight mirror assemblies require only minimal support systems, resulting in a reduction in total system mass, size and overall cost. For devices such as binoculars and cameras, a lighter weight and smaller size enhances the handling and transportability of the device. For other devices, such as telescopes and other applications requiring systems for changing the directions of orientation of the optics, a reduction in weight of the mirror permits the use of actuators which have relatively low output forces and which may be more accurately controlled.

In view of the advantages that accompany optical mirror structures that are lighter in weight, various methods and techniques have been developed to reduce the overall weight of the mirrors. Principally these methods and techniques involve reducing the weight of the substrate.

One method of reducing the weight of the substrate is to reduce the amount of material used in the substrate. For example, U.S. Pat. No. 5,076,700 to DeCaprio is directed to a lightweight mirror having a core that is lightweighted by drilling a series of pockets in the core. After the core is machined, a faceplate having a reflective surface thereon is bonded to the remaining ribs and outer wall of the core.

In U.S. Pat. No. 5,227,921 to Bleier et al., there is disclosed an optical assembly having a core that is comprised of two members, each of which has a plurality of ribs. When the ribs of one member are bonded to the ribs of the other member in a crossing, abutting manner, the result is a core having multiple channels therethrough. Other prior art patents that disclose lightweight mirrors or mirror blanks employing channels or honeycombs include U.S. Pat. No. 3,713,728 to Austin et al., U.S. Pat. No. 4,842,398 to Ducassou, and U.S. Pat. No. 5,604,642 to Deminet et al.

Another technique for reducing the weight of the substrate is to utilize light weight materials to form the substrate. For example, U.S. Pat. No. 4,035,065 to Fletcher et al. discloses a substrate formed from a lightweight cellular glass material. The substrate is directly bonded to a reflective member, and the substrate and reflective member have approximately the same coefficient of thermal expansion.

In U.S. Pat. No. 5,208,704 to Zito, there is disclosed a fibrous substrate made from silica and alumina fibers. The fibers contain voids which are sealed by a clay-containing sealant. A glassy layer and then a reflective layer are applied to the substrate to form an ultralight mirror.

Although the prior art techniques are useful for preparing light weight mirrors or mirror blanks, they nevertheless often involve specialized materials or difficult or time consuming machining operations that increase the cost of fabricating such lightweight mirrors. It would therefore be desirable to have a lightweight mirror blank that can be manufactured from relatively low cost common materials at volume efficiencies, yet deliver high quality optics.

SUMMARY OF THE INVENTION

A principal object of the invention is to provide a light weight, dimensionally stable mirror blank in which the core is made from low cost light weight extruded ceramic honeycomb materials.

Another object of the invention is to provide a light weight mirror blank having a core formed from a material having a low density, good mechanical strength and excellent thermal stability.

Another object of the invention is to provide a low cost light weight mirror blank having a core formed using known extrusion techniques.

A still further object of the invention is to provide a lightweight mirror blank comprising an extruded honeycomb core of glass ceramic material having a low coefficient of thermal expansion and a cell density of at least 16 cells per square inch, the core having a front surface and a back surface, and a faceplate bonded to the front surface of the core, the faceplate manufactured from a material that is capable of being polished to an optical finish.

Another object of the invention is to provide a method of making a lightweight mirror blank comprising the steps of providing an extruded ceramic core having a front surface having a predetermined configuration, providing a faceplate having a back surface which conforms to the front surface of the extruded ceramic core, the faceplate being manufactured from a material that is capable of being polished to an optical finish, and then bonding the back surface of the faceplate to the front surface of the extruded ceramic core.

These and other objects and advantages of the present invention will become apparent to those skilled in the art upon examination of the following description of the invention in conjunction with the accompanying drawings.

DETAILED DESCRIPTION OF THE INVENTION

For purposes of clarity and ease of understanding like elements and components will have the same designations and numbering throughout the figures.

Figure 3:
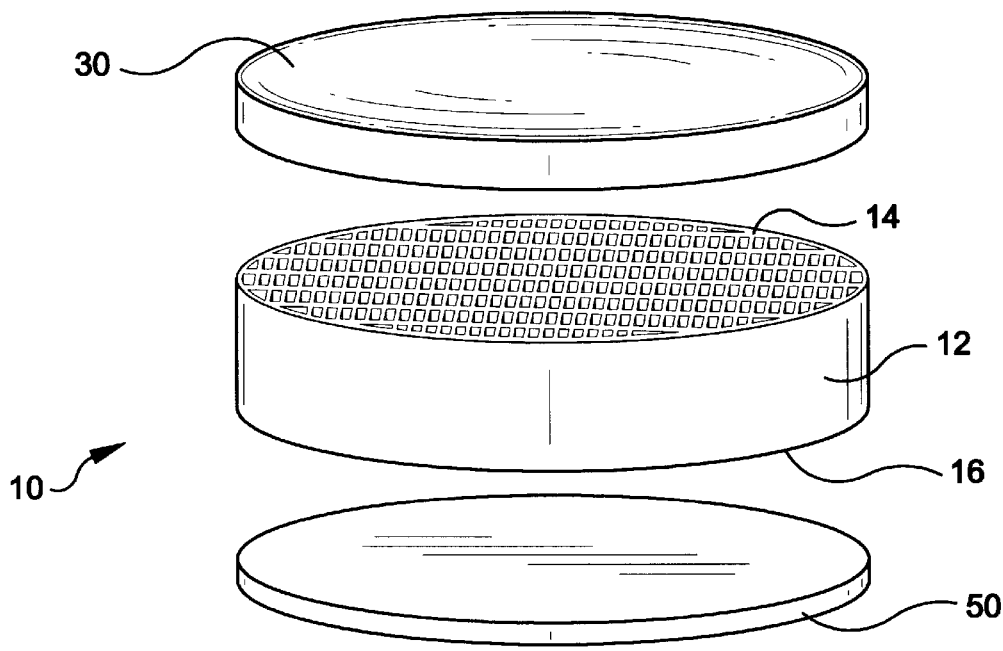
FIG. 3 is an exploded view of another embodiment of the lightweight mirror blank, in which the faceplate has an optical surface that is concave.
Figure 4:
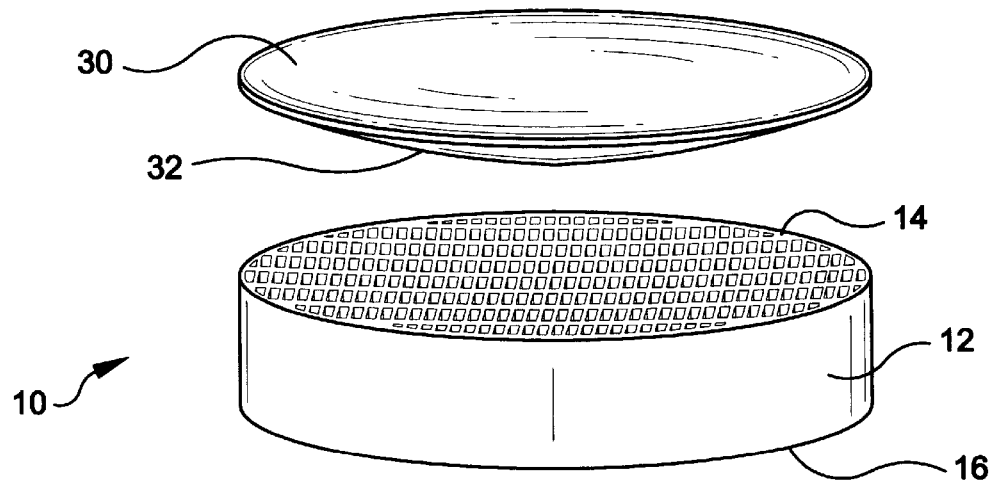
FIG. 4 is an exploded view of another embodiment of the invention, in which the core has a concave front surface and the faceplate has a concave optical surface.
Figure 5:
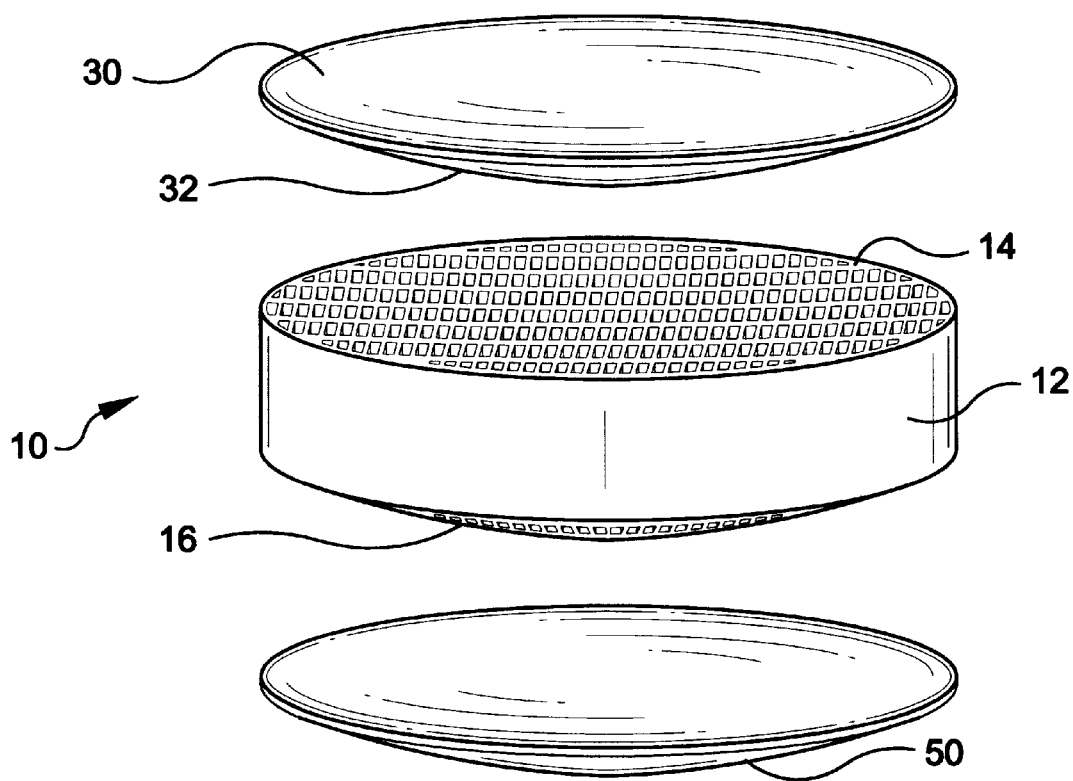
FIG. 5 is an exploded view of another embodiment of the invention, in which the core has a concave front surface, the faceplate has a concave optical surface, and the backplate has a concave surface bonded to a convex back surface of the core.

The essential components of the lightweight mirror blank of the present invention include (1) an extruded ceramic honeycomb core having a front surface with a predetermined configuration, such as plano (FIGS. 1, 2 and 3) or concave (FIGS. 4 and 5), and (2) a faceplate bonded or otherwise attached to the front surface of the core and conforming to the front surface configuration. The faceplate includes an optical surface opposite the surface attached to the core, with the optical surface also having a predetermined configuration, such as plano (FIGS. 1 and 2) or concave (FIGS. 3, 4 and 5). An optional backplate may be bonded or attached to the back surface of the core to improve the mechanical stability and stiffness of the mirror blank.

Figure 1:
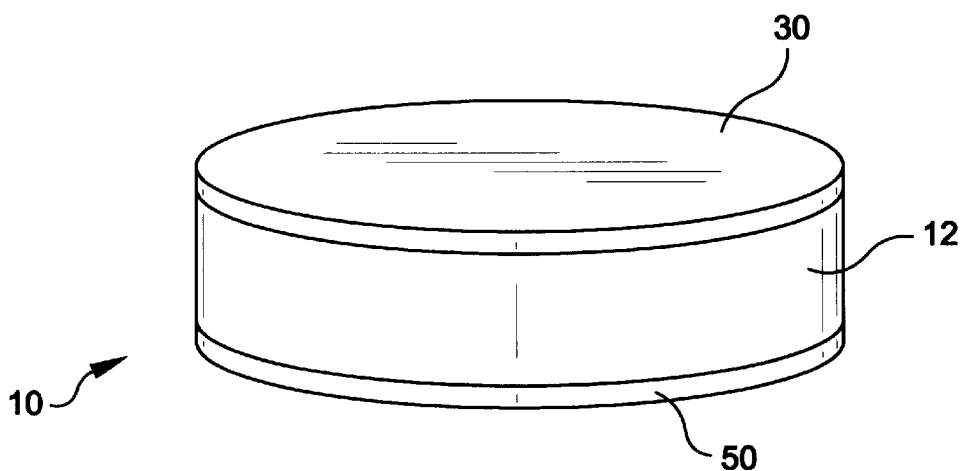
FIG. 1 is a perspective view of the lightweight mirror blank according to the present invention, in which the faceplate has an optical surface that is plano.
Figure 2:
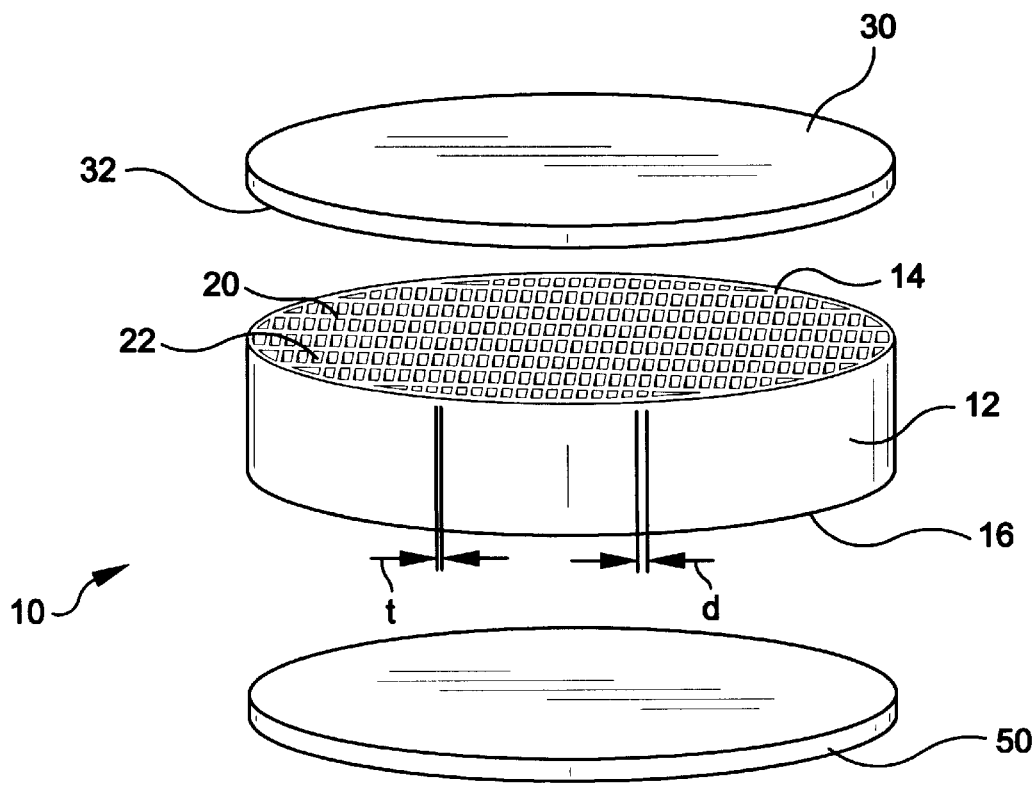
FIG. 2 is an exploded view of the lightweight mirror blank illustrated in FIG. 1.

Turning now to FIGS. 1 and 2, one embodiment of a lightweight mirror blank in accordance with the present invention is shown. The mirror blank 10 includes an extruded ceramic honeycomb core 12 having a front surface 14 and a back surface 16. The honeycomb core comprises a matrix of cell walls 20 defining an array of cells or channels 22 with each cell or channel extending from the front surface 14 to the back surface 16. The cells may be disposed randomly or at a fixed distance from each other. This distance is defined by the cell wall thickness, t. The cells have a cross-sectional shape and size defined by the cell wall. The cross-sectional shape can be any closed shape, such as squares, rectangles, hexagons, triangles, circles or ellipses. The individual cells or channels can be of all the same shape, or combinations of different shapes may be utilized in the same honeycomb core. The cross-sectional size, d, of the cell can be either the same for all cells or vary within the honeycomb core.

The core is made from a crystalline ceramic oxide, such as cordierite, mullite and combinations thereof. Alternatively, the core can be a beta-spodumene ceramic honeycomb. One preferred material for the extruded honeycomb core is sold by Corning Incorporated under the trademark CELCOR®. This is a cordierite ceramic honeycomb product that is normally utilized as diesel particulate filters and as substrates for catalysts and catalyst supports in converting automobile exhaust.

In general, the ceramic honeycomb core 12 is prepared according to procedures known in the art. Thermally crystallizable glass powders, such as cordierite and/or mullite or beta-spodumene forming powders, are mixed together with binders, such as organic binders, to form a plasticized mixture. The plasticized mixture is then extruded through a die to form a shaped green body preferably in the form of a honeycomb. The green body is then fired at a sufficient temperature for a sufficient time to form the ceramic honeycomb. The materials and methods of making such ceramic honeycomb bodies are further disclosed, for example, in U.S. Pat. No. 5,403,787 issued to Day and U.S. Pat. No. 5,258,150 issued to Merkel et al., which patents are herein incorporated by reference in their entirety. Extrusion dies suitable for manufacturing honeycomb structures are disclosed, for example, in U.S. Pat. No. 5,286,323 to Bagley and U.S. Pat. No. 5,487,863 to Cunningham et al., which patents are also herein incorporated by reference in their entirety.

The honeycomb core used herein has a cell density in the range of 16–900 cells per square inch and a bulk material density in the range of 0.28 to 0.49 g/cm$^3$. Because of its high cell density, the core is extremely lightweight, yet it has sufficient strength and dimensional stability to support the faceplate in the mirror blank. Desirably, the honeycomb core has a low coefficient of thermal expansion (CTE) i.e., in the range of –50 to 600 ppb/° C. from 0° to 100°C. Ideally the honeycomb core has a coefficient of thermal expansion of about zero.

The extruded ceramic honeycomb is cut to the desired thickness depending on the size of the mirror blank to be prepared therefrom. Because the honeycomb core 12 is bonded on its front surface 14 to a faceplate 30, it is necessary to shape the front surface of the core so that it can conform as closely as possible to the backside 32 of the faceplate.

Where the backside of the faceplate 30 is plano, as illustrated in FIGS. 2 and 3, further shaping of the front surface 14 of the core may not be necessary. Where the backside of the faceplate is, for example, convex, as illustrated in FIGS. 4 and 5, the front surface of the core can be ground or machined to the desired configuration using known techniques. Although the front surface of the core is illustrated as being plano or concave, it will be appreciated by those skilled in the art that the front surface can be shaped to any desired contour. If a backplate 50 is to be bonded to the core 12, as illustrated in FIG. 5, it may also be necessary to shape the back surface 16 of the core to the desired configuration.

The use of an extruded ceramic honeycomb as the core has several advantages over other core materials used in prior art mirror blanks. For example, the need to lightweight the material by machining or drilling spaces or pockets in the core is eliminated. Moreover, because the core can be extruded into the desired size and basic shape using known extrusion techniques, the core can be fabricated in a very cost effective manner that eliminates waste of the core material.

Once the front surface of the core has the desired configuration, the faceplate 30 is then bonded or otherwise fastened to the front surface 14 of the core. In general, the faceplate 30 may be made from any material that is capable of being polished to an optical finish. Such materials include glasses, glass ceramics and metals. It is highly desirable, however, to utilize a glass or a glass ceramic having a coefficient of thermal expansion (CTE) that is closely equivalent or identical to that of the core for the faceplate.

A mismatch in the CTE between the faceplate and the core can result in permanent stresses between the components during the bonding operation. It is desirable to minimize these stresses in order to reduce the likelihood of cracks in the components. Another reason for matching the CTE of the components is to minimize distortion of the parts when temperature changes occur. During temperature shifts, one component may expand proportionately more or less than the second component, causing distortions to occur. By selecting a glass or a glass ceramic with a very low CTE that matches the low CTE of the core, these distortions can be minimized. In general, it is preferred that the CTE of the core and of the faceplate be within 1 ppm of each other.

One preferred glass contemplated for use as the faceplate 30 is marketed by Corning Incorporated under the tradename ULE®. This glass is a titanium silicate glass containing between about 6 to 8 wt. % $TiO_2$, with a preferred content of about 7 wt.% $TiO_2$. It has a CTE of zero at room temperature. Another glass specifically contemplated for use herein is a high purity fused silica glass, one example of such a glass is marketed by Corning Incorporated under the tradename HPFS®, Corning code 7980. This glass is a high purity synthetic amorphous silicon dioxide glass manufactured by flame hydrolysis. Like the ULE® titanium silicate glass, it also has a very low coefficient of thermal expansion, as well as excellent optical qualities.

Although it is highly desirable to utilize materials for the core and the faceplate having closely matched CTE's, it is also contemplated that, depending upon the desired application for the mirror blank, it may be possible to utilize a faceplate having a CTE that is different from that of the core.

Various means can be used to fasten the faceplate 30 to the core, depending upon the materials selected for the faceplate and the core and the desired configuration and application for the mirror blank. Where the front surface of the core is shaped into a concave configuration, such as illustrated in FIGS. 4 and 5, the faceplate may be either thermally sagged into the core or mechanically forced into the core with either a vacuum or a pressure plate. It is also possible to machine a concave depression into the core and insert a faceplate having a matching contour into the depression.

The core and faceplate can be bonded together using a variety of adhesives, including but not limited to epoxies, RTV (room temperature vulcanizing) silicone adhesives, and solder or bonding materials which, upon heating, will melt and form a bond between the honeycomb core and the faceplate. When the faceplate is constructed from a material having a coefficient of thermal expansion that is closely equivalent or identical to that of the honeycomb core (the ideal condition), it is desirable to use an adhesive that matches the coefficient of thermal expansion of the faceplate and core materials. Where the coefficient of thermal expansion of the core material differs from that of the faceplate, it is necessary that the adhesive sealant utilized to secure the faceplate to the core be a compliant material that would allow some movement between the faceplate and the core in order to prevent distortion. A suitable compliant adhesive sealant is, for example, a RTV silicone.

If desired, a backplate 50 (see FIGS. 1, 2, 3 and 5) can be fastened to the back surface of the core. The backplate adds stiffness and strength to the core that may be necessary for some applications of the mirror blank. The backplate can be made from almost any material, although typically it will be made from a material similar to that of the faceplate. The method for bonding the backplate to the core can be substantially the same as that used for the faceplate, or another alternative method of bonding can be utilized.

The thus prepared mirror blank has high mechanical strength suitable for the lapping and polishing needed to finish the optical reflecting surface to final specifications prior to plating the optical surface with a layer of metal such as aluminum or silver to form the mirror surface. In the case of mirrors that are plano or that have very high f numbers, it may not be necessary to further finish the optical reflecting surface after assembly. In such cases the finished surface is developed before assembly of the faceplate to the core, allowing volume production of the lightweight optical mirror blank.

Those of skill in the art will recognize that modifications and changes may be made to the foregoing device in order to meet particular operating requirements, or environments. All such modifications are intended to be considered within the scope and spirit of the invention which is limited only by the following claims.

What is claimed is:

1. A lightweight mirror blank comprising:
   (a) an extruded ceramic honeycomb core having a low coefficient of thermal expansion and a cell density of at least 16 cells per square inch, the core further having a front surface and a back surface; and
   (b) a faceplate adhered to the front surface of the core, the faceplate manufactured from a material that is capable of being polished to an optical finish.

2. A lightweight mirror blank of claim 1 wherein the extruded ceramic honeycomb is selected from the group consisting of a beta-spodumene ceramic honeycomb, a cordierite ceramic honeycomb, a mullite ceramic honeycomb, and a mixed cordierite and mullite ceramic honeycomb.

3. A lightweight mirror blank of claim 1 wherein the cell density of the core is within the range of 16 to 900 cells per square inch.

4. A lightweight mirror blank of claim 1 wherein the coefficient of thermal expansion of the core is about zero.

5. A lightweight mirror blank of claim 1 wherein the faceplate has a coefficient of thermal expansion that is substantially equal to that of the core.

6. A lightweight mirror blank of claim 5 wherein the faceplate is bonded to the core using an adhesive that has a coefficient of thermal expansion that is substantially equal to that of the faceplate and the core.

7. A lightweight mirror blank of claim 1 wherein the faceplate has a coefficient of thermal expansion that is different from that of the core.

8. A lightweight mirror blank of claim 7 wherein the faceplate is bonded to the core using a compliant adhesive.

9. A lightweight mirror blank of claim 8 wherein the compliant adhesive is a silicone adhesive.

10. A lightweight mirror blank of claim 1 further including a backplate adhered to the back surface of the core.

11. A lightweight mirror blank of claim 10 wherein the faceplate and the backplate are manufactured from the same material.

12. A lightweight mirror blank of claim 1 wherein the faceplate is manufactured from a material selected from the group consisting of glasses, glass-ceramics and metals.

13. A lightweight mirror blank comprising a ceramic honeycomb core having a front surface and a back surface, the honeycomb core comprising a matrix of cell walls defining an array of cells extending longitudinally between the front surface and the back surface, said honeycomb core formed by an extrusion process, and a faceplate bonded to the front surface of said honeycomb core, the faceplate manufactured from a material capable of being polished to an optical finish.

14. A lightweight mirror blank of claim 13, wherein the honeycomb core has a cell density of at least 16 cells per square inch.

15. A lightweight mirror blank of claim 14 wherein the honeycomb core has a cell density within the range of 16 to 900 cells per square inch.

16. A lightweight mirror blank of claim 13, wherein the honeycomb core is made from a ceramic material selected from the group consisting of beta-spodumene, cordierite, mullite, and mixtures of cordierite and mullite.

17. A lightweight mirror blank of claim 13, wherein the honeycomb core has a coefficient of thermal expansion of about zero.

18. A lightweight mirror blank of claim 17 wherein the faceplate has a coefficient of thermal expansion that is substantially equal to that of the honeycomb core.

19. A method of making a lightweight mirror blank comprising the steps of:
   (a) providing an extruded ceramic core having a front surface having a predetermined configuration;
   (b) providing a faceplate having a back surface which conforms to the front surface of the extruded ceramic core, the faceplate being manufactured from a material that is capable of being polished to an optical finish; and
   (c) bonding the back surface of the faceplate to the front surface of the extruded ceramic core.

20. The method of claim 19 wherein the ceramic core is formed by extruding a plasticized mixture of thermally crystallizable glass powders to form a green body, and firing the green body at a sufficient temperature for a sufficient time to crystallize the glass powder and thereby form the ceramic core.

21. The method of claim 20 wherein the green body is formed by extrusion through a honeycomb die.

22. The method of claim 20 wherein the glass powders are selected from the group consisting of cordierite, mullite and beta-spodumene forming powders.

23. A method of making a ceramic honeycomb core for a lightweight mirror blank wherein the mirror blank includes the core and a faceplate fastened to the core, the method comprising the steps of:
   (a) extruding a plasticized mixture of thermally crystallizable glass powders through a honeycomb die to form a green extruded cellular honeycomb body;
   (b) firing the green extruded cellular honeycomb body to produce a ceramic honeycomb; and
   (c) shaping an end of the ceramic honeycomb in order to receive the faceplate.

24. The method of claim 23 wherein the ceramic honeycomb has a cell density within the range of 16 to 900 cells per square inch.

25. The method of claim 23 wherein the ceramic honeycomb is selected from the group consisting of a beta-spodumene ceramic honeycomb, a cordierite ceramic honeycomb, a mullite ceramic honeycomb, and a mixed cordierite and mullite ceramic honeycomb.

* * * * *